United States Patent [19]

Lair

[11] Patent Number: 4,543,035
[45] Date of Patent: Sep. 24, 1985

[54] METHOD FOR LOADING CARGO

[76] Inventor: George J. Lair, 17 Battery Pl., Suite 2022, New York, N.Y. 10004

[21] Appl. No.: 589,589

[22] Filed: Mar. 14, 1984

Related U.S. Application Data

[63] Continuation of Ser. No. 311,556, Oct. 14, 1981, abandoned.

[51] Int. Cl.$^4$ ............................................. B65G 67/00
[52] U.S. Cl. .................................. 414/786; 108/52.1; 108/55.1; 414/139; 414/404; 414/417
[58] Field of Search ............... 414/404, 417, 391–393, 414/497, 608, 661, 786, 110, 137, 139, 140; 294/74, 75; 108/51.1, 52.1, 55.1, 55.5

[56] References Cited

U.S. PATENT DOCUMENTS

| | | |
|---|---|---|
| 2,256,453 | 9/1941 | Bomar . |
| 2,593,494 | 4/1952 | Seward . |
| 2,634,154 | 4/1953 | O'Brien . |
| 2,683,010 | 7/1954 | Hamerslag, Jr. . |
| 2,808,157 | 10/1957 | Terrill . |
| 3,389,775 | 6/1968 | Sause ............................. 414/139 X |
| 3,412,876 | 11/1968 | Calabrese . |
| 3,421,641 | 1/1969 | Frey . |
| 3,494,490 | 2/1970 | Shell . |
| 3,826,058 | 7/1974 | Preisig . |
| 4,085,846 | 4/1978 | Williams . |

Primary Examiner—Robert G. Sheridan
Attorney, Agent, or Firm—Brumbaugh, Graves, Donohue & Raymond

[57] ABSTRACT

In accordance with the method and apparatus of the invention for loading cargo, palletized cargo is pushed off of a pallet as a unit and onto a slinger platform. The slinger platform has a base divided into two platform areas with transverse slots containing cargo slings. The cargo slings are thereafter attached to a hoisting bridle of a crane or the ship's gear, and the loads, supported by the cargo slings, are lifted simultaneously off of the slinger platform and into the ship's hold, where they are landed on a platform or received directly by forklifts for stowage. The cargo slings are unhooked on one side of the load and withdrawn from under the load by the hoisting gear and returned to the dock to repeat the process. Modifications may be made whereby 4, 6, 8 or 10 pallet loads may be lifted simultaneously.

5 Claims, 9 Drawing Figures

METHOD FOR LOADING CARGO

This application is a continuation of application Ser. No. 311,556, filed on Oct. 14, 1981, now abandoned.

BACKGROUND OF THE INVENTION

This invention relates to an improved method for loading cargo, for example, into the hold of a vessel, and the apparatus for carrying out this improved method.

Over the past several decades the major portion of loose bagged or packaged cargo has been loaded and discharged from vessels, and stored in terminals, using skids or pallets. For stevedoring operations, that is the operation of loading or unloading cargo onto or from ships using hoisting apparatus, pallets are used that vary in size from 4'×6' to 5'×7' depending on the nature of operations. Such pallets are generally constructed of 1" hardwood boards with three intermediate 4"×4" stringers between the reversible working surfaces. Channels on each end provide lifting slots for gear to be inserted for hoisting.

Warehousing facilities, on the other hand, generally use pallets that differ in size and construction from stevedoring pallets, since fork lifts, rather than hoists, are used to transport the former. Warehouse pallets are typically about 40"×48" and have intermediate stringers flush with the sides in the length of the pallet. The stringers are generally equipped with slots to allow forklift trucks entry from both the width and length of the pallet.

As an example of a loading operation, the bagged or packaged cargo is received prepalletized at the terminal on, for example, open flatbed trucks or closed trailers, and must be stacked by lifttruck on the warehouse pallets for storage in the terminal. In the terminal, two warehouse pallets are often stored on a single 4'×6' stevedoring pallet to lend tiering stability.

The stevedoring pallet, supporting the two warehouse pallets, is thereafter brought along side the ship. A hoist is connected to the stevedoring pallet, and the three pallets, supporting the cargo, are hoisted on board the vessel. On board, the cargo is removed from the pallets and stacked for storage on the vessel by hand. The two warehouse pallets and the stevedoring pallet are then returned to the dock.

For a vessel loaded, for example, with 12,000 metric tons of bagged sugar, at 1.2 metric tons per warehouse pallet, 10,000 warehouse pallets and 5,000 stevedore pallets would be hoisted into the vessel during loading, emptied by hand, and transported off the vessel. Accordingly, the aggregate number of pallet handlings for this 12,000 metric ton load would be 30,000 pallet moves.

Alternatively, the bagged or packaged cargo may be received by rail, truck, or a vessel and handled onto stevedoring pallets for storage in the terminal to await shipment. In that case, the stevedoring pallets and the cargo thereon are hoisted on board the vessel and the empty pallets returned to the dock.

SUMMARY OF THE INVENTION

The present invention is an improved method for loading bags of cargo onto a vessel, along with apparatus therefor, which reduces significantly the handling of cargo pallets and the loading and unloading of pallets by hand. In accordance with the present invention, cargo may be loaded quickly, easily, and with less manual labor than was heretofore possible.

In a preferred embodiment, before the cargo is stacked on the warehouse pallets or stevedoring pallets, a cardboard slip sheet, having the approximate dimensions of the pallet, is placed on the working surface of the pallet. The cargo is then stacked on the cardboard slip sheet on top of the pallet.

A slinger platform also is provided to be used dock side. The slinger platform has a metal base and a vertical divider perpendicular to the base which separates the slinger platform into two platform areas of substantially equal size. Each platform area is provided with transverse slots in which cargo slings are placed. A second cardboard slip sheet is then placed on each of the platform areas over the cargo slings.

In a loading operation, two loads of palletized cargo are placed adjacent the two slinger platform areas. Each load of cargo is pushed off of the warehouse pallet as a unit, aided by the cardboard slip sheets on the pallet and on the slinger platform, and onto the platform areas over the cargo slings. The palletized bags of cargo may be pushed onto the platform areas by a forklift equipped in the front with a flat pushing surface.

The cargo slings beneath the cardboard slip sheets of both loads are attached to a hoisting bridle which in turn is hoisted by crane or the ship's gear, thereby simultaneously lifting both pallet-loads, or one draft of cargo, off of the slinger platform and onto the vessel.

Because each load has slip sheets beneath the bags, the loads may be landed directly on the two blades (or four blades and/or a plate) of a forklift truck(s). The cargo slings are withdrawn by the hoisting gear after landing the cargo on, for example, the two blades of a forklift truck, by unhooking the bridle from one side of the cargo slings. The cargo may then immediately be moved by the forklift to the wings and/or forward and after ends of the vessel for stowage without handling of individual bags.

Alternatively, the sling-load may be landed on a platform provided with a stringer arrangement, as illustrated in FIG. 8. The stringers provide entry beneath the sling-load for the blades of a forklift truck, which removes the load from the landing platform to a place of stow in the vessel.

As vessel configurations vary, the loading of the forward and after ends and the wings of lower hold compartments may require some topping-off by hand. It is estimated, however, that this topping-off operation would not amount to more than about 20% of the average hold stowage.

The squares of the hatches in the average vessel may be from 25% to 40% of the vessel's entire cubic capacity. In bulk carriers, the squares of the hatches may be as much as 80% of the cubic capacity of the vessel. To maximize production in these areas, a modified slinger platform may be used to lift four pallet-loads of cargo (two drafts) simultaneously, or several two-section slinger platforms side-by-side may be used to lift as many as 8 or more pallet loads in a single lift. As in the one draft operation described above, an important feature in these modified operations is the ability to withdraw the cargo lifting slings and stow the bags without manually handling the cargo.

In experimental implementation of the method and apparatus to date, the present invention has increased production to 2½ to 3 times the tons per gang hour in hatch squares, and has even greater potential as labor becomes more accustomed to the operation of the invention.

In some square-of-hatch loading systems, disposable slings are used. Because the hoisting gear withdraws the slings in the present invention, disposable slings are not required, and thus additional savings are realized by using the same slings over and over again.

The invention may be adapted to handle not only bagged cargo, but also cargo packaged in cartons, bales, cases, etc., and will perform with similar efficiency as described in the bag loading operation.

For a better understanding of the invention, reference is made to the following detailed description of a preferred embodiment taken in conjunction with the drawings accompanying the application.

DETAILED DESCRIPTION OF THE PREFERRED EMBODIMENTS

Figure 1:
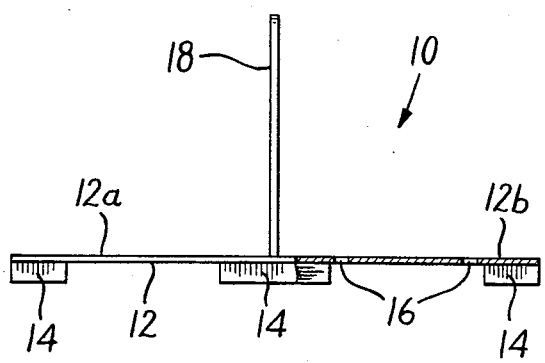
FIG. 1 is a front elevational view in partial cross section of the slinger platform used to handle the load of two conventional warehouse pallets in the exemplary embodiment of the present invention.
Figure 2:
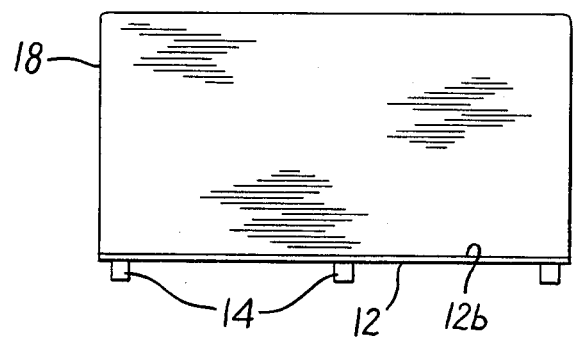
FIG. 2 is a side elevational view of the slinger platform illustrated in FIG. 1.
Figure 3:
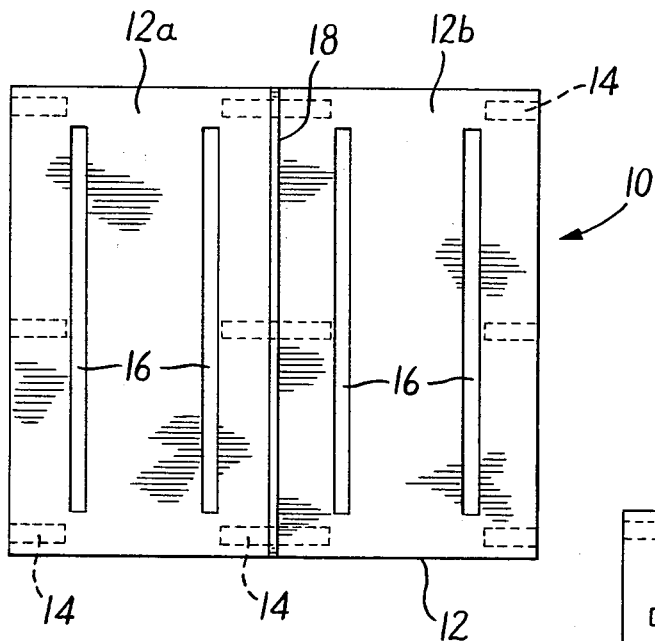
FIG. 3 is a top plan view of the slinger platform illustrated in FIG. 1.

With reference to FIGS. 1-3, a slinger platform 10 is provided in accordance with the present invention. The slinger platform 10 has a support surface 12 separated into two platform areas 12a and 12b of substantially equal area by a vertical central divider 18 welded to the base 12. Beneath the base 12 there are also welded a plurality of legs 14.

A pair of transverse slots 16 is provided in each platform area 12a and 12b which can receive cargo slings, as described below in connection with FIGS. 5 and 6.

Figure 5:
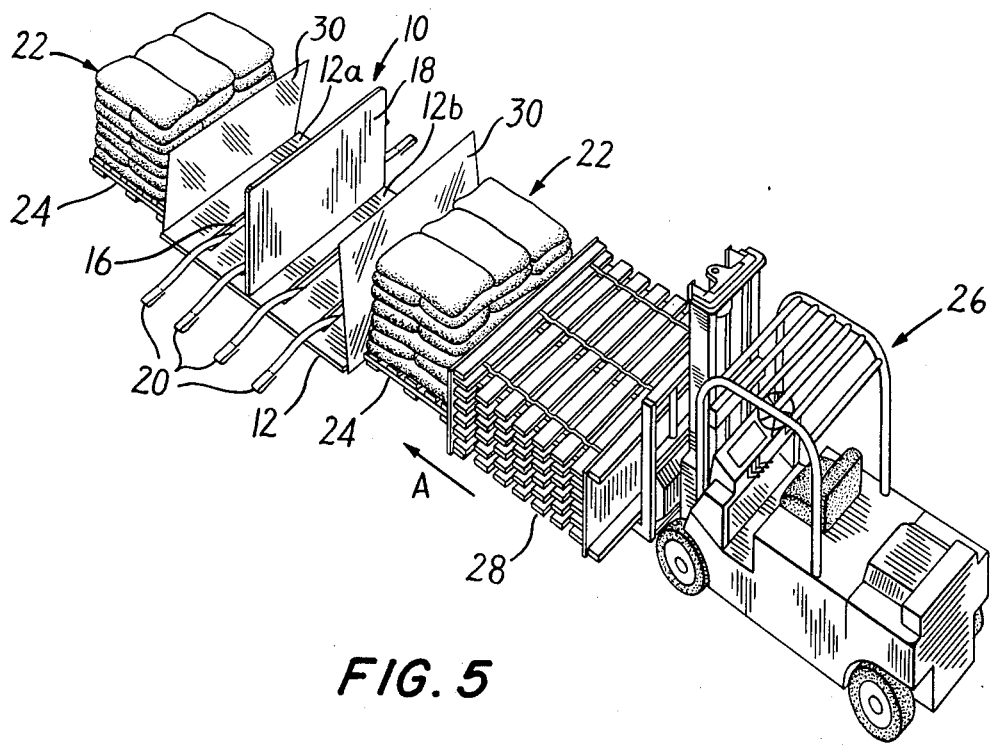
FIG. 5 is a perspective illustration of two loads of palletized cargo positioned adjacent to the slinger platform, one of which is about to be pushed onto the slinger platform.
Figure 6:
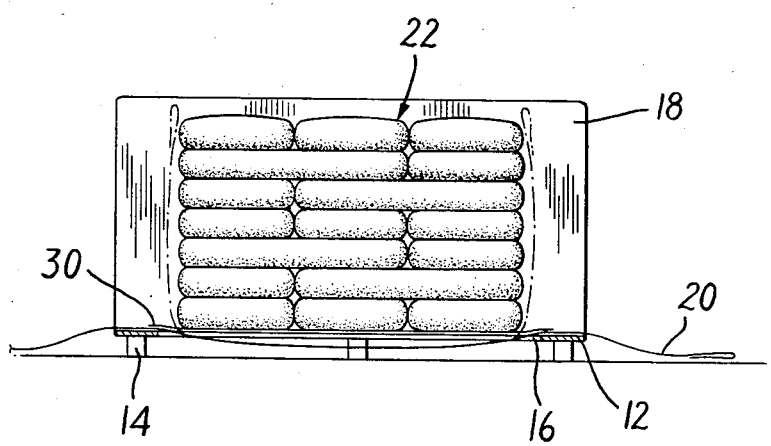
FIG. 6 is a side elevational view of one warehouse pallet load of cargo positioned on the slinger platform above the slings and cardboard slip sheet and ready to be hooked to the hoisting bridle.

Referring to FIGS. 5 and 6, bags of cargo 22 are stacked on pallets 24. Between the cargo 22 and the pallets 24, cardboard slip sheets (not illustrated) are provided to aid in sliding the cargo 22 off of the pallet 24 and onto the slinger platform 10 as will be described.

Palletized cargo 22 is placed adjacent to the slinger platform 10, on each side thereof, and a pair of cargo slings 20 is placed in the two slots 16 of each platform area. A device is thereafter used to push the load of cargo as a unit onto the platform area 12a or 12b. This may be done by a forklift truck 26 equipped in the front with a mechanized pusher device, or as in the arrangement shown in FIG. 5, with a stack of pallets and a plywood face-sheet which is used to push the cargo 22 as a unit off of the pallet 24. It will be understood, however, that any other suitable device may be used which is capable of pushing the bags of cargo, as a unit, off the pallet.

Cardboard slip sheets 30 the approximate size of the platform areas 12a and 12b are placed on the platform areas 12a and 12b, above the cargo slings 20, to reduce sliding friction. Accordingly, with the aid of the cardboard slip sheet on the pallet 24, the pusher device 28 slides the cargo 22 off of the pallet 24 and onto the slip sheets 30 above the slings 20 on the platform area 12b. As shown in FIG. 5, one edge of the sheet 30 may be disposed between the pallet 24 and the platform such that the sheet 30 is gripped during sliding. The operation is then repeated for the other platform area 12a. In each case, the presence of the cargo on the other side of the divider 18 anchors the slinger platform 10 to facilitate loading.

Figure 7:
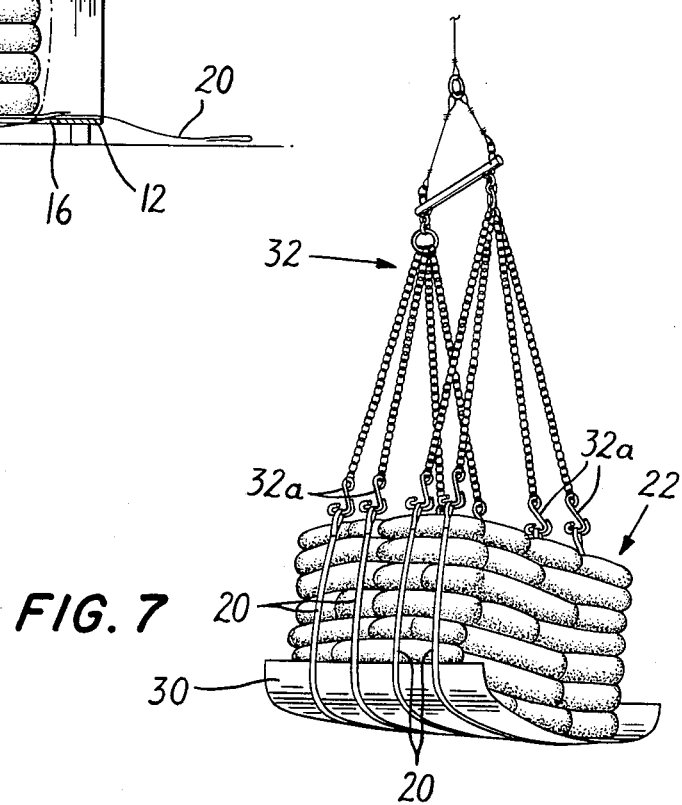
FIG. 7 is a partial perspective illustration of two warehouse pallet loads being hoisted simultaneously onto a vessel in accordance with the present invention.

The hooks 32a of a hoisting bridle 32 are attached to the slings 20, as shown in FIG. 6, and the two cargo loads are lifted simultaneously off of the platform areas 12a and 12b by the hoisting bridle 32, which is attached in turn to a crane or to the ship's gear, and hoisted into the ship's hold. The hooks 32a are relatively flat and have a "J" shaped configuration, as seen in FIG. 7, which permits easy fastening and unfastening of the cargo slings 20 to the hooks 32a. The hooks are attached to the bridle by ½" alloy chain, which has been found in experimental uses to be satisfactory. Typically, the cargo slings are formed of nylon straps of approximately 2,000 lbs. test, the terminal ends of which are folded back onto themselves and stitched to form loops into which the J-shaped hooks 32a are inserted. The slings 20 are preferably of a length sufficient to extend upwardly along the sides of the stacks of cargo at least to a point adjacent the top of the load, as illustrated more clearly in FIG. 7. This will aid in unfastening the hooks 32a to permit the withdrawal of the slings 20, as described more fully below.

Figure 8:
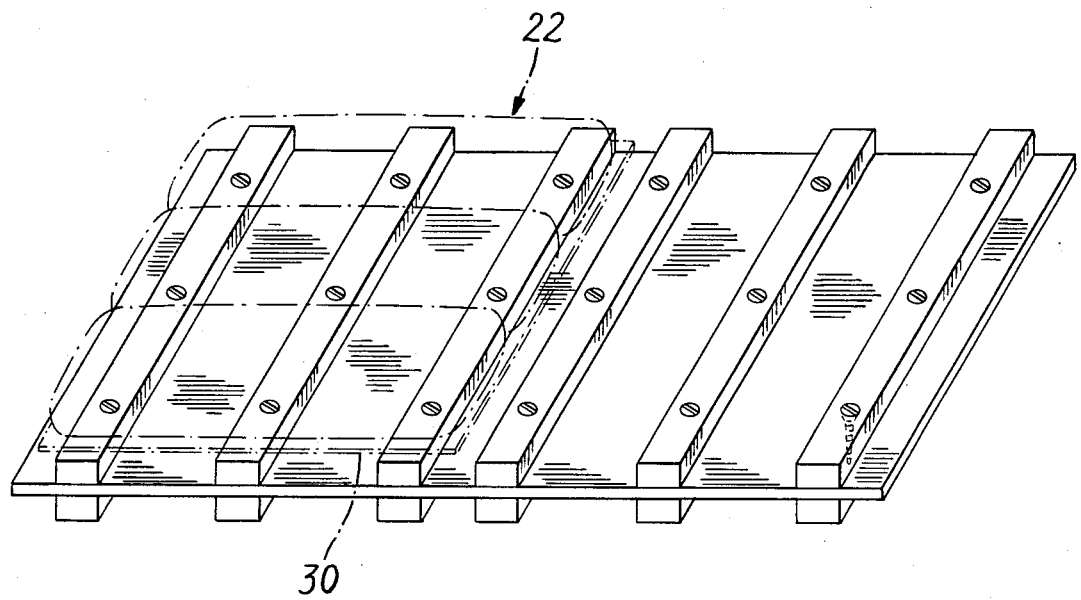
FIG. 8 is an illustration of a platform for use on board the vessel for receiving a load of cargo hoisted on board in accordance with the present invention.
Figure 9:
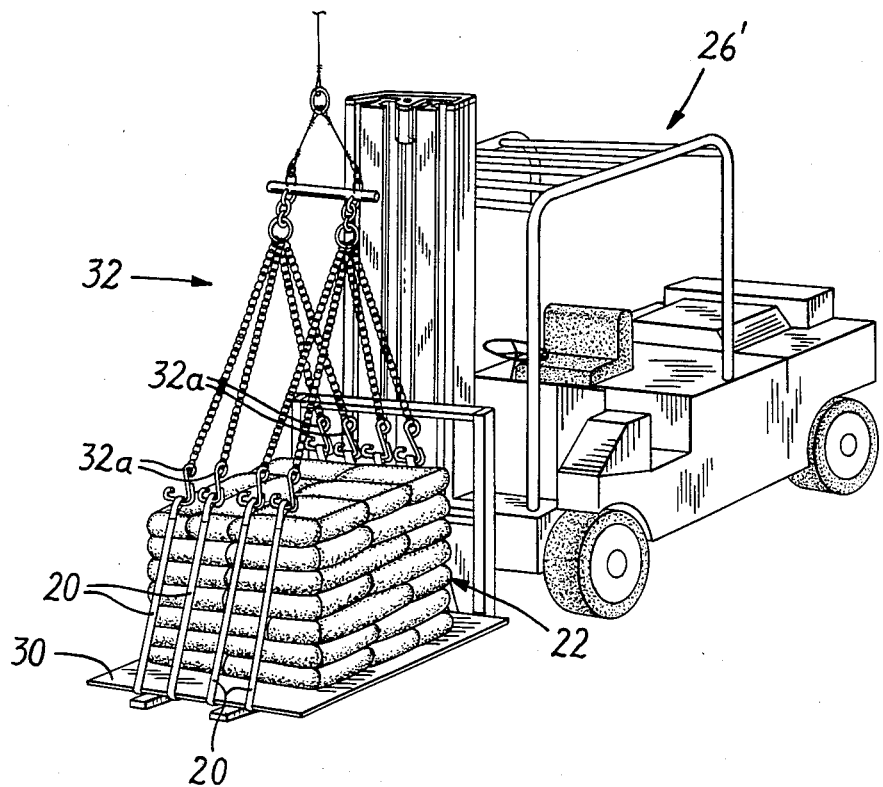
FIG. 9 illustrates the transfer of cargo from a hoist to a forklift truck for unloading cargo hoisted on board the vessel.

Once on board the ship the cargo may be received directly by the blades of a forklift, as shown in FIG. 9, truck or onto a platform, as illustrated for example in FIG. 8. As illustrated in FIG. 9, a forklift 26' has, for example, two forks onto which the loads are landed directly. The cargo slings 20 are withdrawn by the hoisting gear after the cargo 22 is set down on the forklift blades by unhooking the bridle 32 from one side of the cargo slings 20. The cargo 22 may then be immediately moved by the forklift 26' to the wings and/or forward or aft ends of the vessel for stowage without handling of individual bags.

As illustrated in FIG. 8, the platform comprises a course of 4"×4" stringers 36 arranged between two 1" sheets of plywood 38, with a second course of stringers 36 thereon, the platform being held securely together by bolt 40. The cargo slings 20 are unfastened from the hooks 32a on one side of the bridle, and then can be withdrawn from under the load by the hoisting gear, thus permitting the reuse of the slings 20. The hoisting gear is returned to the dock and the process is then repeated. The cargo may then be moved immediately to the forward, after or wing sections of the hold for stowage.

Once all areas accessible to the forklift have been filled in this manner, remaining areas of the hold may be filled in the conventional hand manner until the wings are filled with cargo.

Figure 4:
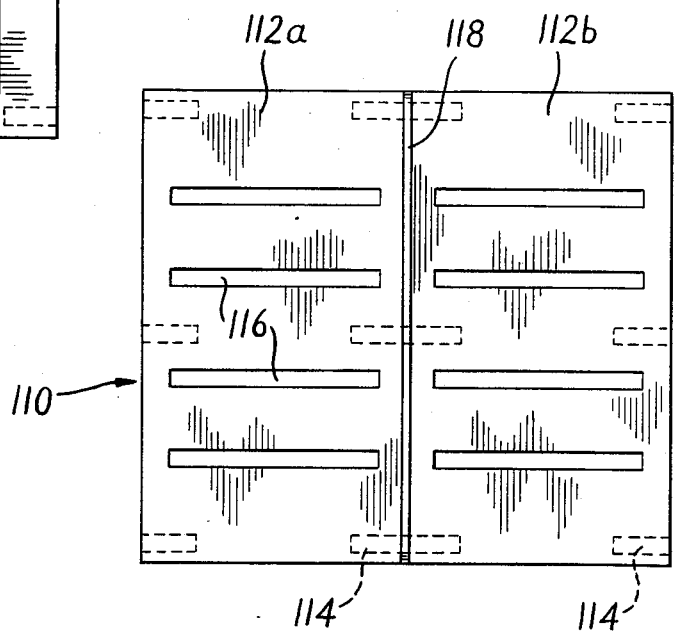
FIG. 4 is a top plan view of a modified slinger platform adapted to handle the load of four conventional warehouse pallets.

With reference now to FIG. 4, there is illustrated a modified slinger platform 110. The modified slinger platform 110 is larger than the slinger platform 10, and is adapted to receive four loads of palletized cargo instead of two. Unlike the slot 16 in the slinger platform 10, in the modified slinger platform 110 the slots 116 for receiving the cargo slings are perpendicular to the central divider 118.

The modified slinger platform 110 is particularly well suited for the handling of cargo from conventional stevedoring pallets. The manner of pushing the cargo onto the platform 110 is similar to that described in connection with the two-load slinger platform 10. Once the cargo has been lowered into the hatch, the cargo slings 20 are unfastened from the hooks 32a on one side of the bridle, and are then withdrawn from under the load by the hoisting gear.

Alternatively, two, three, four, five or more two-load slinger platforms 10 may be arranged side-by-side (such that the central dividers 18 are in a straight line) so that as many as four, six, eight, ten or more pallet loads may be lifted simultaneously into the ship, with suitable modifications to the hoisting bridle.

The invention may be adapted to handle not only bagged cargo, but also cargo packaged in cartons, bales, cases, etc., and will perform with similar efficiency.

The foregoing represents the preferred embodiments of the invention. It will be understood by those skilled in the art that various modifications and variations may be made without departing from the spirit and scope of the invention. All such modifications and variations, therefore, are intended to be encompassed within the scope of the invention as defined in the appended claims.

I claim:

1. A method of loading palletized bags and the like of cargo into the hold of a vessel, comprising the steps of:
    arranging cargo sling means on a platform means having a support surface, wherein each of said slings has a first and second end;
    placing a slip sheet on said support surface over said cargo sling means;
    pushing said cargo as a substantially intact unit off of a pallet onto said slip sheet on said support surface and over said cargo sling means;
    coupling said first and second ends of said cargo sling means to a hoist means;
    hoisting said substantially intact unit of cargo off said support surface and onto said vessel;
    lowering said substantially intact unit of cargo onto a pair of spaced support arms of a fork lift in said hold;
    unhooking one of said first and second ends of said cargo sling means from said hook means; and
    withdrawing said hoist means and said slings from said substantially intact unit of cargo, whereby said cargo can thereafter be placed in a desired location by said fork lift.

2. A method in accordance with claim 14 further comprising the step of interposing a central divider on said platform means to separate said support surface into two platform areas of substantially equal area, wherein each platform area is provided with a plurality of spaced slots therein for receiving cargo sling means, pushing cargo as a substantially intact unit from a pallet onto each of the two platform areas prior to hoisting, and hoisting both pallet loads of cargo simultaneously.

3. A method in accordance with claim 2, wherein said palletized cargo includes a bottom layer of elongated bags arranged parallel to each other and wherein said slots are arranged transverse to the bags in said bottom layer.

4. A method in accordance with claim 3, comprising the steps of pushing two loads of palletized cargo, each as a substantially unit, onto each platform area, providing a plurality of spaced slots in each platform area adapted to be disposed under two adjacent cargo loads on said platform area, positioning cargo sling means in each said slot and hoisting the four pallet loads of cargo simultaneously.

5. A method in accordance with claim 1, wherein a second slip sheet is interposed between said cargo and said pallet.

* * * * *

UNITED STATES PATENT AND TRADEMARK OFFICE
CERTIFICATE OF CORRECTION

PATENT NO. : 4,543,035
DATED : September 24, 1985
INVENTOR(S) : George J. Lair

It is certified that error appears in the above-identified patent and that said Letters Patent is hereby corrected as shown below:

Column 4, line 46, after "forklift" insert -- truck --;

Column 4, line 47, delete "truck".

Column 6, line 19, "claim 14" should read -- claim 1 --; and

Column 6, line 35, after "substantially" insert -- intact --.

Signed and Sealed this

Eighth Day of April 1986

[SEAL]

Attest:

DONALD J. QUIGG

Attesting Officer

Commissioner of Patents and Trademarks